(12) United States Patent
Shimoda et al.

(10) Patent No.: US 7,022,931 B2
(45) Date of Patent: Apr. 4, 2006

(54) SLIDE SWITCH ASSEMBLIES

(75) Inventors: Yuji Shimoda, Kawagoe (JP); Hiroshi Ochiai, Kawagoe (JP)

(73) Assignee: Kabushiki Kaisha T an T, Kawagoe (JP)

( * ) Notice: Subject to any disclaimer, the term of this patent is extended or adjusted under 35 U.S.C. 154(b) by 0 days.

(21) Appl. No.: 11/005,302

(22) Filed: Dec. 7, 2004

(65) Prior Publication Data

US 2005/0133357 A1   Jun. 23, 2005

(30) Foreign Application Priority Data

Dec. 22, 2003   (JP)   ............................. 2003-425310

(51) Int. Cl.
*H01H 15/06*   (2006.01)
(52) U.S. Cl. ........................ 200/550; 200/547; 200/252
(58) Field of Classification Search ........ 200/547–550, 200/548, 549, 252, 16 B, 16 C
See application file for complete search history.

(56) References Cited

U.S. PATENT DOCUMENTS

| | | | | |
|---|---|---|---|---|
| 3,882,056 A | * | 5/1975 | Nakasone | ................. 200/16 C |
| 4,035,594 A | * | 7/1977 | McKinney et al. | ........ 200/16 D |
| 4,737,602 A | * | 4/1988 | Yamamoto | ................. 200/16 D |
| 5,672,854 A | * | 9/1997 | Nishio | ........................ 200/16 R |
| 5,824,977 A | * | 10/1998 | Takano et al. | ............. 200/16 C |
| 6,273,593 B1 | | 8/2001 | Yabata et al. | |
| 6,384,357 B1 | * | 5/2002 | Morrison | ..................... 200/520 |
| 6,402,570 B1 | | 6/2002 | Soga et al. | |

* cited by examiner

*Primary Examiner*—K. Lee
(74) *Attorney, Agent, or Firm*—Nixon & Vanderhye, PC

(57) ABSTRACT

A slide switch assembly comprises a housing and a slider having traveling contacts which define exposed contact faces. An accommodation section is formed in the housing to receive the slider and allow the slider to be moved slideably therein. A printed circuit board having fixed contact plates is attached to the printed circuit board. The printed circuit board is assembled with the housing such that the fixed contact plates are in opposition to the traveling contacts and adapted to make electrical contact with the traveling contacts in response to sliding movement of the slider. Preferably, the printed circuit board includes a printed conduction pattern, and the fixed contact plates include fixation bases adapted to be soldered to the conduction pattern and a bent contact portion extending therefrom. The accommodation section is most preferably defined by a partition wall having openings such that the contact portions of the fixed contact plates are positioned to be exposed through the openings.

6 Claims, 11 Drawing Sheets

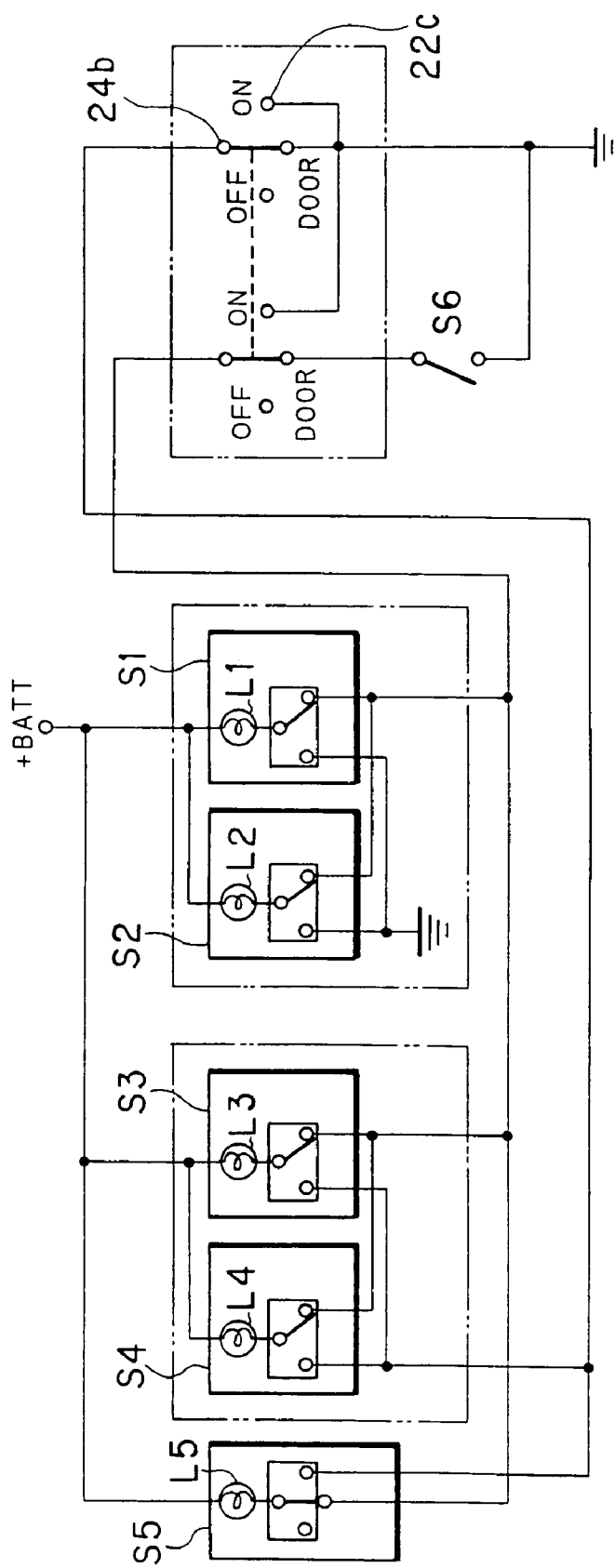

SLIDE SWITCH ASSEMBLIES

FIELD OF INVENTION

The present invention relates generally to slide switch assemblies used to control a lamp associated with an automotive room lamp system in which a member soldered to the printed circuit board loaded with spot lights (e.g., light emitting diodes (LEDs)) is used as a fixed contact for the slide switch.

BACKGROUND OF THE INVENTION

A conventional slide switch for controlling a blinking lamp of an automotive room lamp system is disclosed, for example, in U.S. Pat. No. 6,402,570 (the entire content of which is incorporated expressly hereinto by reference). In accordance with the conventional slide switch disclosed therein, bus bars are arranged on the back side of the base in which the lamp is accommodated. The base body has an accommodation portion formed therein to receive a traveling contact member. Some portions of the bus bars are bent to extend along the inner walls to thereby serve as fixed contacts. When the slide switch is turned on, the lamp and the power source are thus connected to illuminate the lamp by the bus bars.

Recently, in this connection, there was developed a device equipped with a light emitting diode in the base thereof for illuminating localized portions of an automotive interior, such as a cup holder or the like. In order to install such a light emitting diode in the base portion, the diode is required to be soldered to the printed circuit board, with the printed circuit board then in turn being loaded into the base body.

In the situation whereby the printed circuit board and the slide switch are arranged together on a single base body, it is required that a connector is used to electrically connect the printed circuit board and the slide switch or that the printed circuit board and the fixed contacts of the slide switch are connected by use of lead wires. Therefore, such arrangements can give rise to problems such that an increasing number of parts are required while the connectors are to be connected or that time consuming work for soldering the lead wires is required, thereby resulting in increased manufacturing costs.

SUMMARY OF THE INVENTION

The present invention has been made in order to solve the above mentioned problems and has an one of its objects to provide a fixed contact structure of a slide switch which can improve assembly. More specifically, according to the present invention, conductors attached to the conducting patterns of the printed circuit board are used as fixed contacts of the slide switch to ensure that the printed circuit board and the slide switch are readily connected without incorporation of a slide switch and a connector.

The fixed contact structure of a slide switch of the present invention is provided in order to realize the above mentioned object by comprising a housing; an accommodation section formed in the housing to receive a slider such that the slider is adapted for sliding movement therein; traveling contacts having contact faces and accommodated in the slider such that the contact faces are exposed outside thereof, and a printed circuit board having fixed contact plates attached to the printed circuit board; the printed circuit board being adapted to be loaded onto the housing such that the fixed contact plates are brought into electrical conduction with the traveling contacts.

The fixed contact plates are preferably composed of fixation bases adapted to be soldered to the conduction pattern and contact portions bent to rise outwardly from the fixation bases. The accommodation section is most preferably defined by a partition wall having openings such that the contact portions of the fixed contact plates are adapted to be exposed therethrough.

The contact portions are preferably further bent to form engagement portions adapted for engagement with the openings.

The engagement portions are preferably formed with relatively narrow-width cutouts whereas the partition wall is composed of upright portions defining the openings. These upright portions are therefore adapted to hold the cutouts in the fixed contact plates.

The printed circuit board preferably has a back side on which bus bars are arranged thereon, the bus bars being adapted for connection with electrical loads, such as illumination lamps that may be equipped on the printed circuit board.

A microphone, a connector terminal box and/or a light emitting diode may preferably be mounted onto the printed circuit board.

Still further, the partition wall defining the accommodation section preferably has an inner wall with which the fixed contact plates are set in flush to assure smooth sliding movement of the traveling contacts when the slider is in motion.

As detailed in the foregoing, the present invention is especially embodied in an accommodation section which is formed in the housing to receive a slider, the printed circuit board being loaded (mounted) onto the housing such that the fixed contacts plates are brought into electrical connection with the traveling contacts. Therefore, the fixed contacts and the slide switch are easily connected to improve its functionality and working efficiency.

The fixed contact plates are preferably soldered to the printed circuit board and a component part thereof is secured to the wall defining the accommodation section by means of an engagement portion to assure firm fixation of the fixed contact plates to the accommodation section. As a result, the printed circuit board is firmly held to the base body in which the accommodation section is formed.

The backside of the base body may be provided with bus bars for connection to the electrical loads, such as illumination lamps installed to the base body. As a result it is possible to connect the lamps and the printed circuit board arranged with other electrical loads, such as a light emitting diode, merely by means of bus bars.

The fixed contact plates are most preferably set flush with the inner wall surface of the accommodation section. Such a mounting arrangement provides beneficial effects such as promoting a smooth sliding movement of the traveling contacts on the slider against the inner wall surface of the accommodation section.

BRIEF DESCRIPTION OF THE DRAWINGS

Reference will be made to the accompanying drawings wherein like reference numerals throughout the various Figures denote like structural elements, and wherein:

FIG. 11 is the diagram of a circuit for controlling other illumination lights by means of the slide switch.

DETAILED DESCRIPTION OF THE PREFERRED EMBODIMENTS

In the fixed contact structure according to the present invention, an accommodation section is formed in the housing thereof to receive a slider therein, the housing being loaded with a printed circuit board such that fixed contact plates attached to the printed circuit board are brought into electrical conduction with the traveling contacts.

Hereinafter, embodiments of the fixed contact structure of the present invention being applied to the automotive room lamp will be explained with reference to the drawings.

Figure 1:
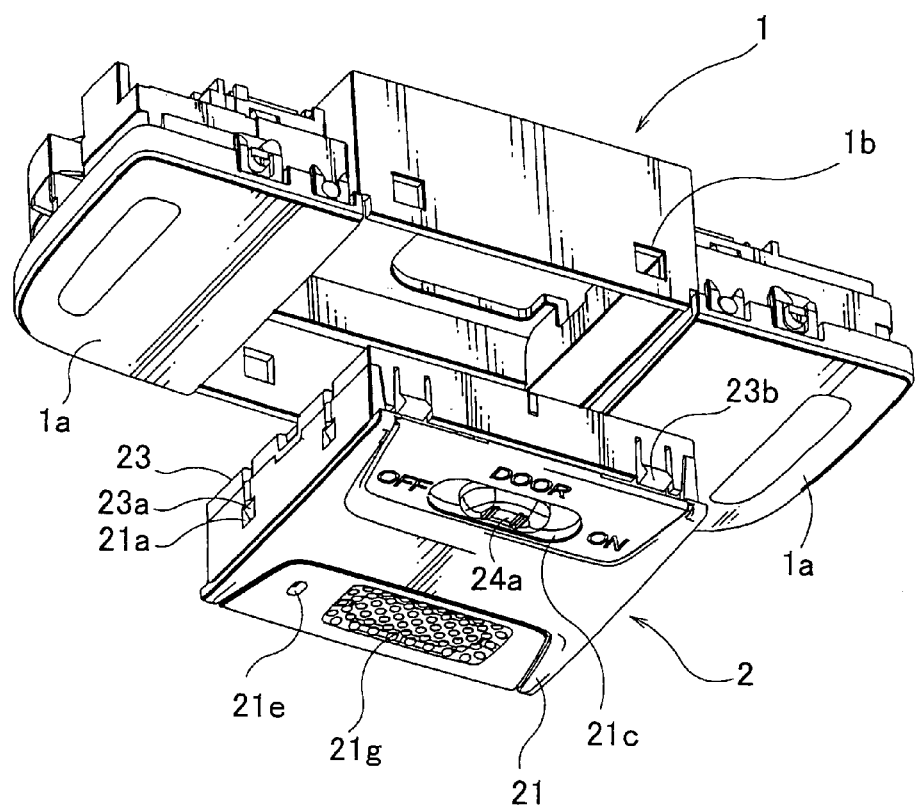
FIG. 1 is a perspective view of the automotive room lamp assembly partly broken, the fixed contact structure of a slide switch of the present invention being applied to the automotive room lamp assembly.

Referring to FIG. 1 which is a perspective view of the automotive room lamp system in general, the numeral 1 denotes a box-shaped base body formed by injection molding or the like, the body being divided into three chambers aligned generally in a longitudinal direction. In the respective left hand and right hand chambers, lamps and push switches are accommodated while lens plates 1a are pivotally supported thereto on the central chamber sides thereof in cantilever fashion.

When each lens plate 1a is pressed at an end portion thereof opposite to the pivotal end thereof, the above mentioned push switches are turned on to light the lamp and when the lens plate 1a is pressed again in a similar way, the push switch is operated to switch off the lamp. The thus structured automotive room lamp system is known as disclosed in U.S. Pat. No. 6,273,593 (the entire content of which is expressly incorporated hereinto by reference). Furthermore, bus bars (not shown) to connect the lamp and the push switch are mounted to the back side of the base body 1.

Figure 2:
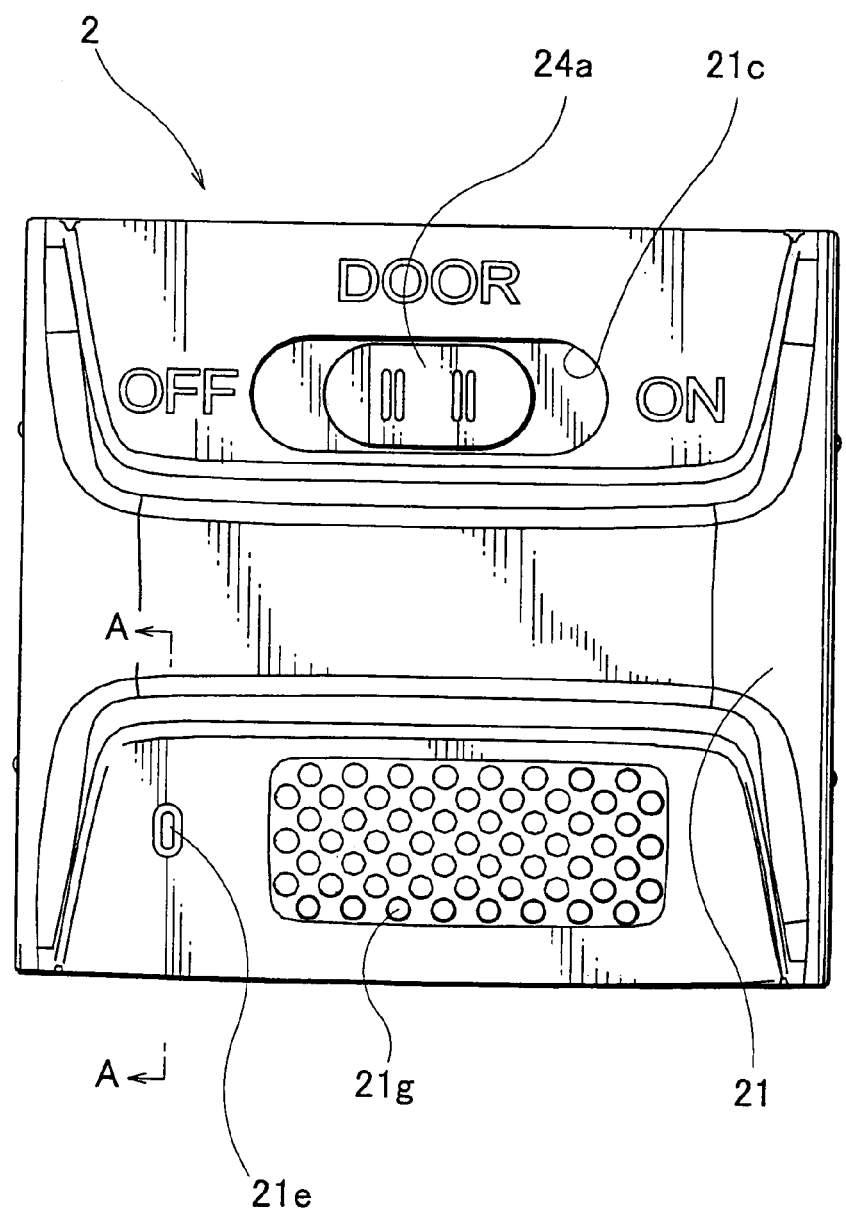
FIG. 2 is a front view of the assembled state of the fixed contact structure shown in FIG. 1.
Figure 3:
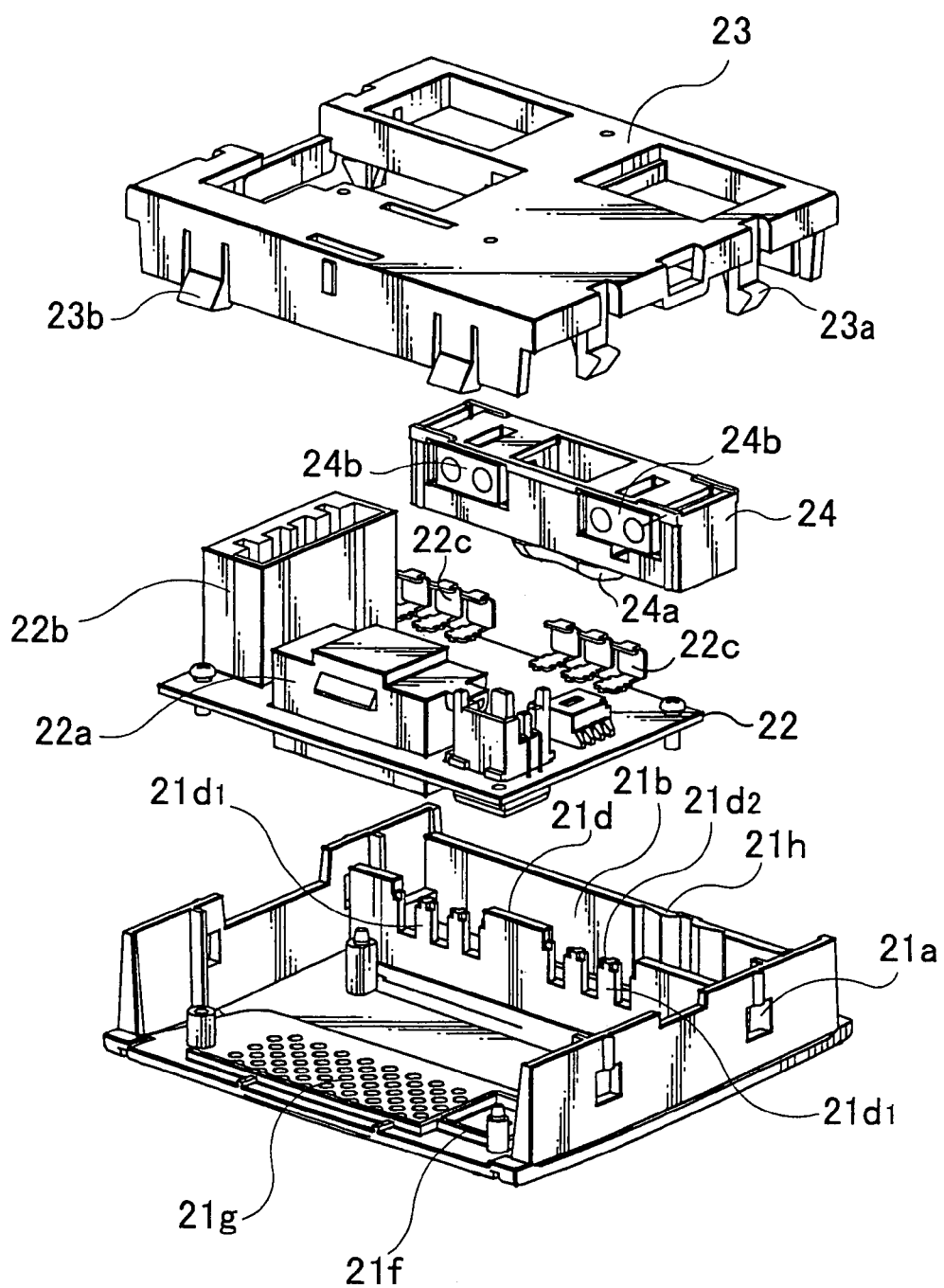
FIG. 3 is an exploded perspective view of the switch box as shown in FIG. 1.

The numeral 2 denotes a switch box to be accommodated in the central chamber of the base body 1, the structure of the box being shown in greater detail in FIGS. 2 and 3. As is shown, the switch box 2 is composed of a front plate 21, a printed circuit board 22 mounted to the interior of the front plate 21 by means of screws or the like. A back plate 23 is engaged with a hole 21a in the front plate 21 by way of claw 23a from the back thereof so as to be made integral with the front plate 21. A slider or traveling contact member 24 has a knob 24a protruding through a slot 21c in the front plate 21. The slot 21c thus provides access to the slider 24 to allow lateral sliding manipulation of the same.

Figure 10:
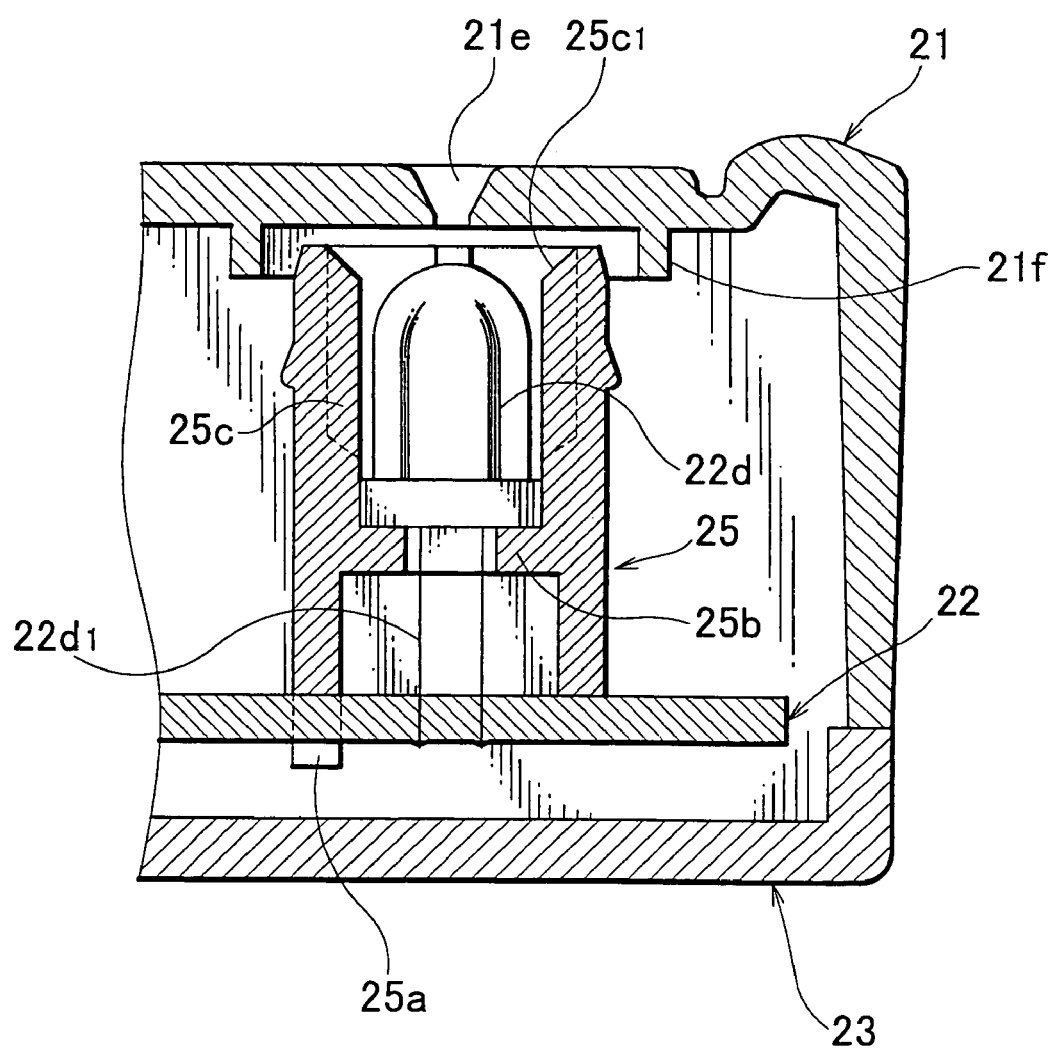
FIG. 10 is a cross sectional view of the light emitting diode being soldered to the printed circuit board.

The front plate 21 has a partition wall 21d which defines an accommodation section 21b. The partition wall 21d has upright portions 21d1 which define six cutouts 21i, each upright portion 21d1 being formed with steps at its upper portion. The front plate 21 is formed with a transparent window 21e for letting out the light from a light emitting diode 22d which will be explained later. On the back side of the front plate 21, there is further formed a light shielding wall 21f to surround the transparent window 21e. (See FIG. 10) It is to be noted in this connection that the numeral 21g denotes a sound collecting hole for picking up sound for a microphone to allow a hand free use of a cellular phone, for example.

Figure 6:
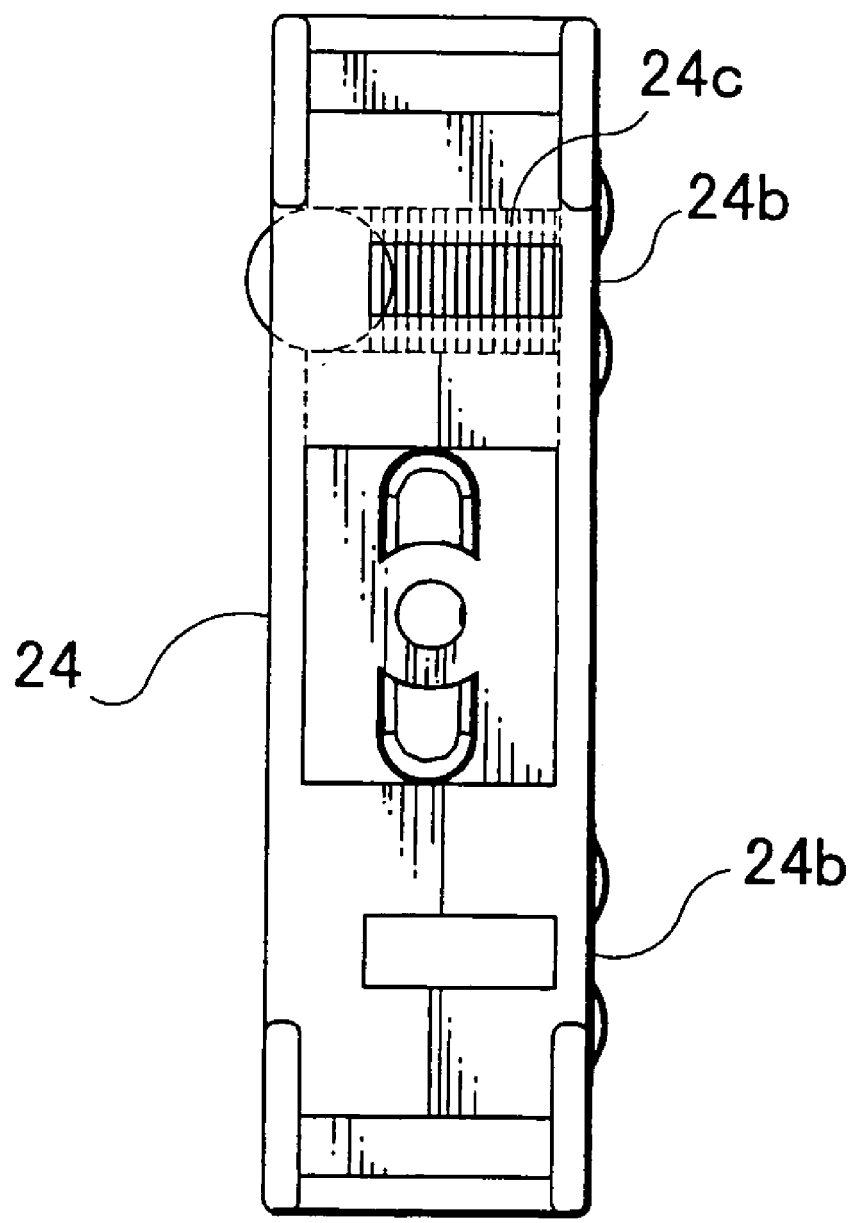
FIG. 6 is a sectional view of the traveling contacts of the slide switch.
Figure 7:
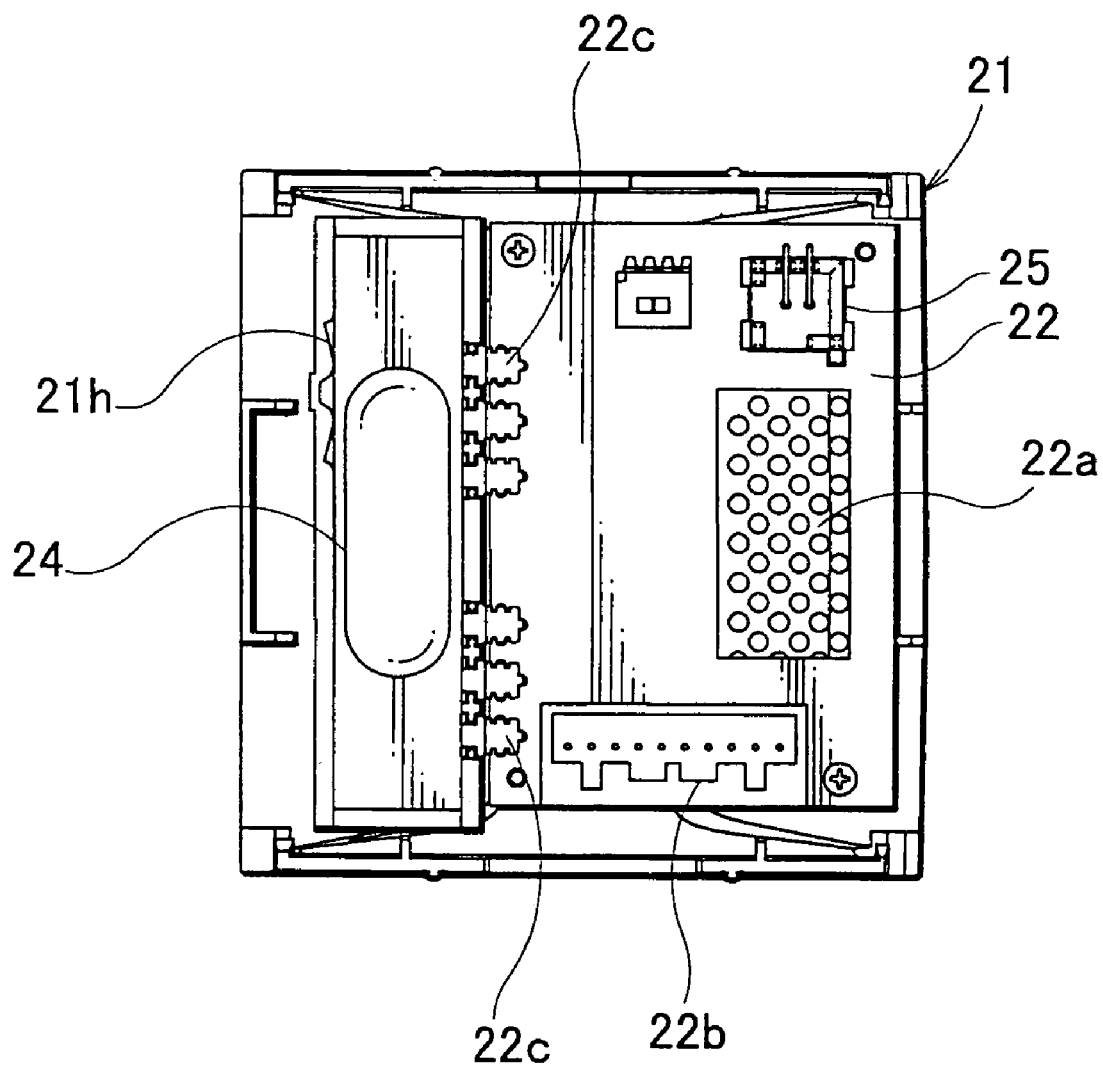
FIG. 7 is a plan view of the assembled slide switch.
Figure 8A:
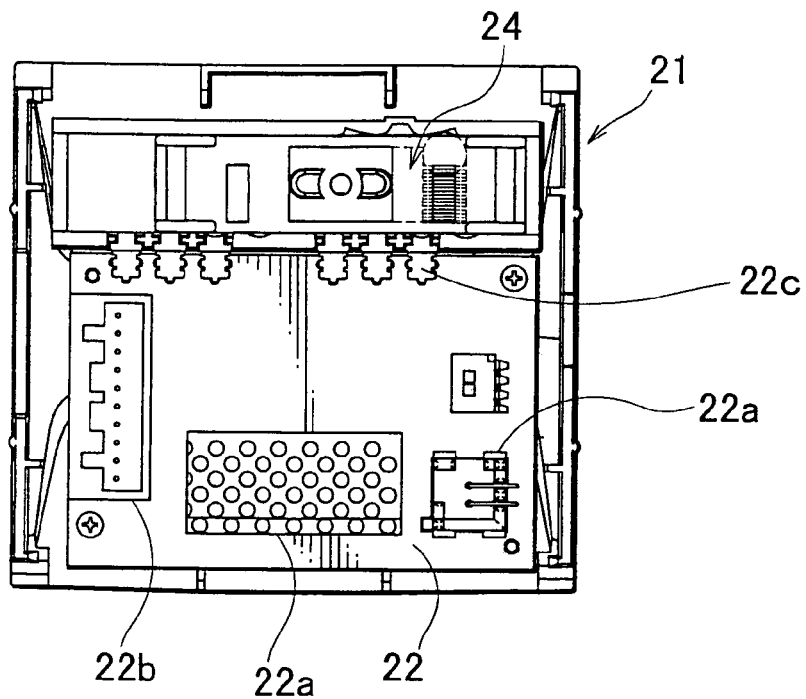
FIG. 8a is a plan view of the slider in motion in an OFF state and FIG. 8b is a plan view of the same in an ON state.
Figure 8B:
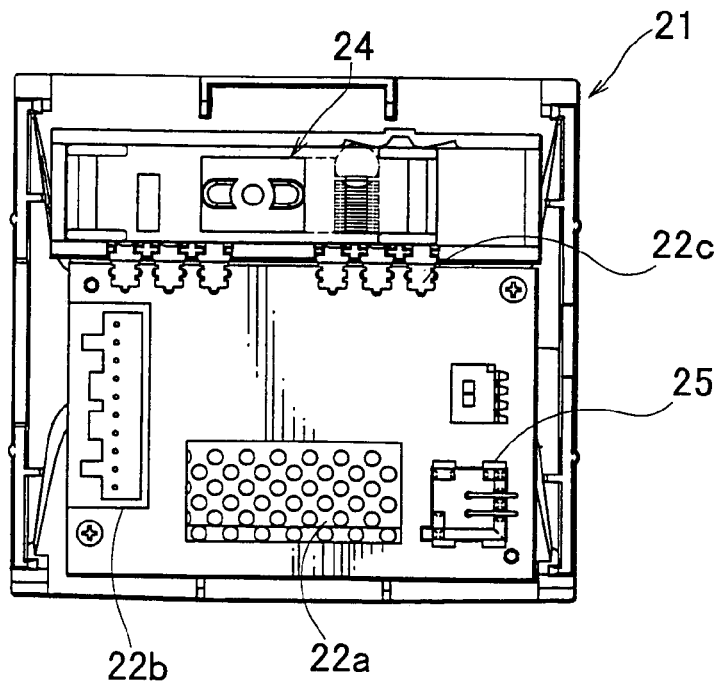

The slider 24 slidably accommodated in the accommodation section 21b is oriented such that the knob 24a thereof protrudes through the slot 21c in the front plate 21. As shown in FIG. 6, the slider 24 is provided with two traveling contacts 24b and having contact faces and urged by springs 24c toward the partition walls 21d such that the contact faces are exposed outside thereof, each traveling contact 24b being arranged for the contact faces to short any two of the fixed contact plates 22c to be described later on.

Figure 9:
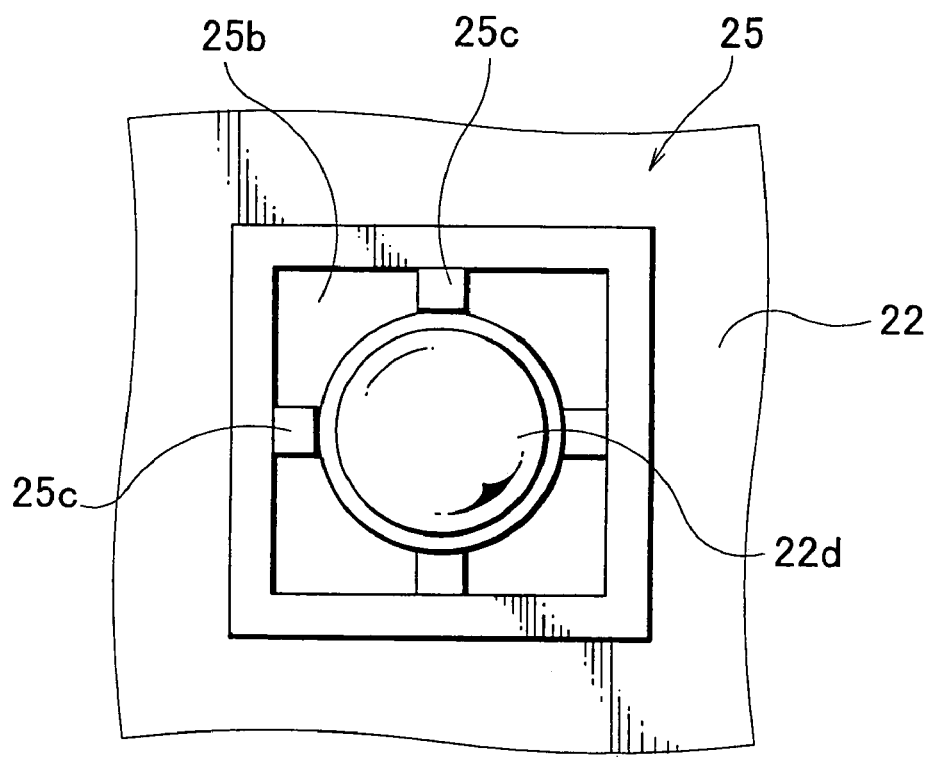
FIG. 9 is a plan view of the light emitting diode being mounted to the printed circuit board.

The printed circuit board 22 is soldered with a microphone 22a, a connector terminals 22b to be led out into the connector box 22b for connecting the bus bars and the power source to the connectors, fixed contact plates 22c to be engaged with the upright portions 21d1 of the partition wall 21d in the front plate 21 and the light emitting diode 22d to do spot illuminating. (See FIGS. 9 and 10)

Figure 4:
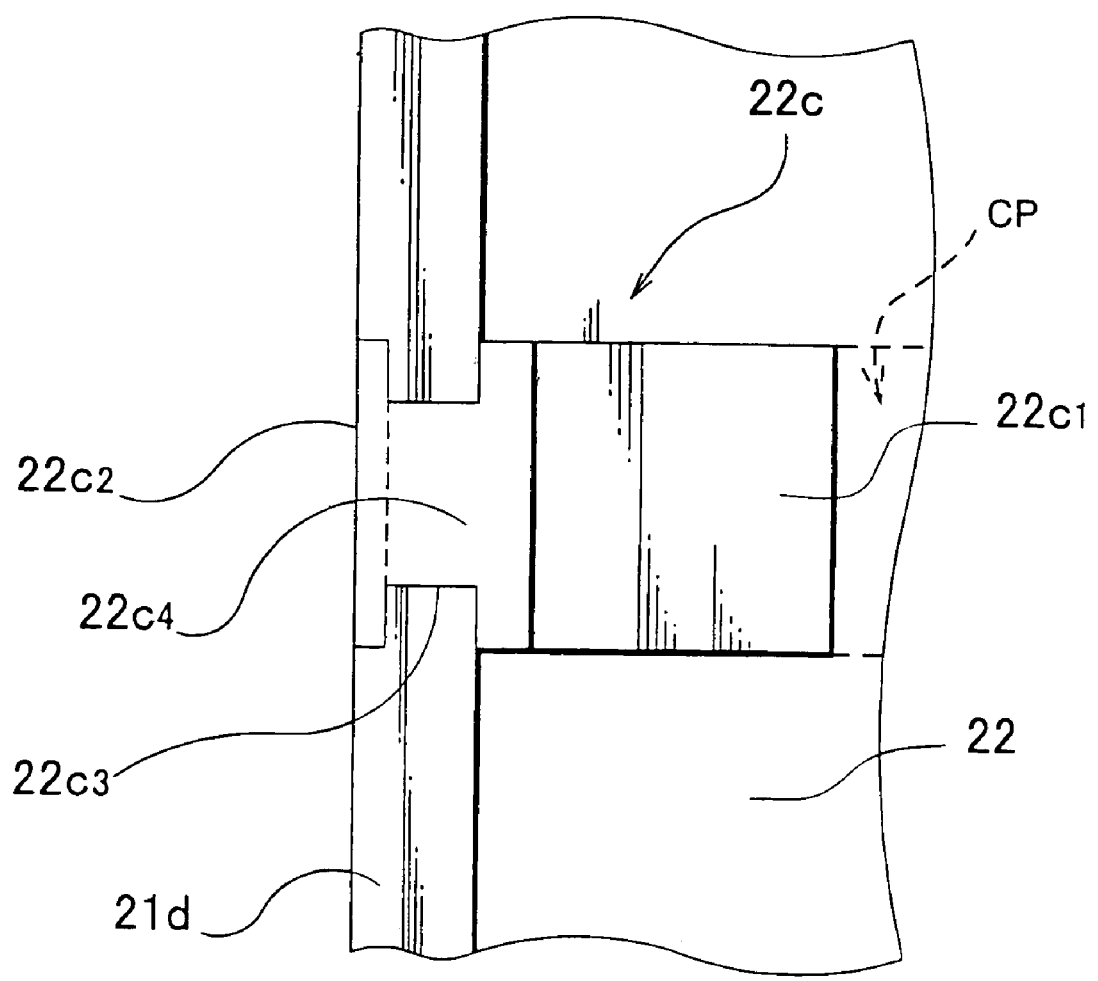
FIG. 4 is a plan view of the essential portion of the slide switch.
Figure 5:
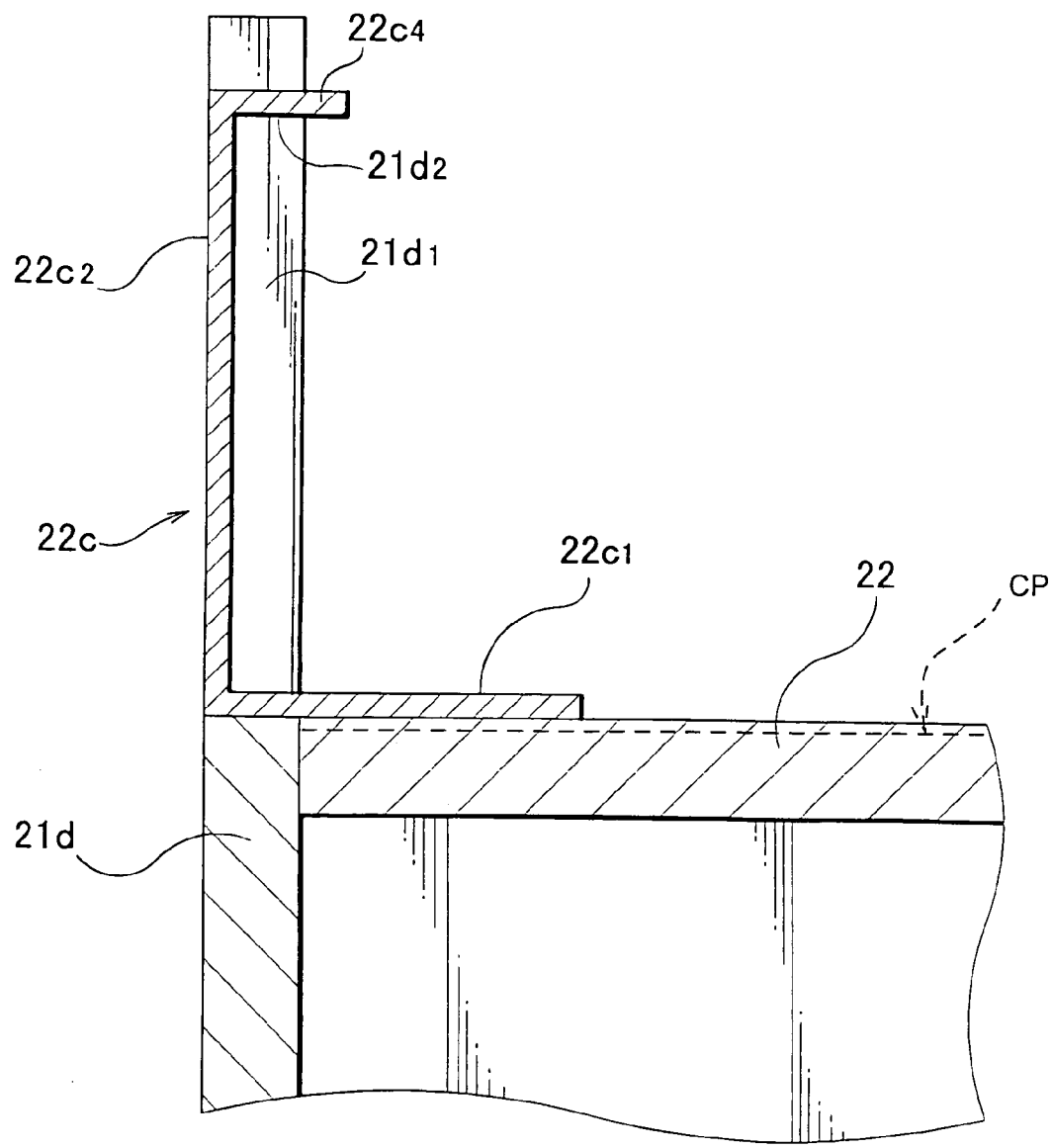
FIG. 5 is a sectional view of FIG. 4.

As shown in FIGS. 4 and 5, the respective fixed contact plates 22c have fixation bases 22c1 to be connected to the conduction patterns CP (schematically depicted as dashed lines) of the printed circuit board 22, contact portions 22c2 rising from the fixation bases 22c1 and engagement portions 22c4 having cutouts 22c3 therein such that the entire structure is channel shaped as viewed from the side.

The procedure of bringing the fixed contact plates 22c into engagement with the partition walls 21d of the accommodation section 21b will be explained hereinafter. In this regard, it is to be noted that the fixed contact plates 22c are soldered to the printed circuit board 22. Therefore, when the printed circuit board 22 is assembled with the front plate 21, the engagement portions 22c4 of the contact plates 22c will be inserted into the generally U-shaped openings defined by the upright portions 21d1. The relatively narrow width cutouts 22c3 in the fixed contact plates 22c are thereby received within and slidably guided downwardly by the upright portions 21d1. During assembly, the fixed contact plates 22c will ultimately reach a lowermost extent of being guided downwardly along the upright portions 21d1, at which time the upper engagement portions 22c4 of the contact plates 22c are brought into abutment with the steps 21d2 formed in the upright portions 21d1. As such, the contact plates 22c will be seated in their final fixed position so as to be exposed through the openings of the upright portions 21d1. In such a state, the printed circuit board 22 may then be further fastened to the front plate 21 by means of screws or the like to ensure that the fixed contact plates 22c are secured immovably to the partition wall 21d without play.

The contact portions 22c2 of the contact plates 22c are thus positioned so as to be substantially flush with the surfaces of the upright walls 21d. Such a flush mounting of the contact portions 22c2 thereby ensures that the traveling contacts 24b of the slider 24 move relatively smoothly when the slider 24 within the accommodation section 21b is manipulated so as to slide relative to the fixed contact plates 22c.

It is to be noted that the accommodation portion 21b is also defined by an outer wall standing opposite to the partition wall 21d. The outer wall preferably has a patterned indented surface 21h formed in the inner side thereof so as to provide a clicking feel upon the sliding movement of the slider 24. The switch box 2 is assembled into an integral body by securing the printed circuit board 22 to the front plate 21, inserting the slider 24 into the accommodation portion 21b, engaging the back plate 23 to the front plate 21 and then bringing a claw 23b formed in the back plate 23 into engagement with a hole 1b formed in the base body 1. (See FIG. 1)

In the preferred embodiment, the printed circuit board 22 is provided with two sets of fixed contact plates 22c, the two sets being formed in separated positions, each set having three fixed contact plates 22c. On the other hand, the slider 24 is provided with a pair of traveling contacts 24c in separated positions, thus enabling the slider 24 to cause the fixed contacts 22b to perform a two-step switching action while being slid. If the thus constructed slide switch is to be installed in a vehicle such as a minivan or the like having three rows of seats, the circuit as shown in FIG. 11 will be required.

More specifically, the push switches S1 and S2 incorporated with the slide switches to be used for a front seat illumination in a vehicle, the push switches S3 and S4 loaded with two lamps to be used for a middle seat illumination light and the switch S5 loaded with two lamps for rear seat illumination are connected as shown in FIG. 11 such that the operation of the middle seat and rear seat illumination lamps is controlled by sliding the front seat slide switch. It is to be noted in this connection that the numerals L1 to L5 denote lamps whereas the numeral S6 denote a door switch to be turned on in response to the opening of a car door.

Hereinafter, the control operation thereof will be explained. In case the traveling contacts of the respective switches S1 to S5 have been switched to the fixed contact side as shown while the traveling contact 24b is connected to the door contact of the fixed contact plate 22c, the respective switches S1 to S5 are grounded by way of the door switch S6 which is turned ON when the door is opened. In this state, all the lamps L1 to L5 connected to the respective switches S1 to S5 are lit. On the other hand, all the lamps L1 to L5 are turned off if the door is closed to open the door stitch S6.

When the traveling contacts 24b of the slide switch are turned to the ON side of the fixed contact plates 22c while the switches S1 to S5 are as depicted, the traveling switch 24b is grounded regardless of the ON-Off position of the door switch S6, thus enabling all the illumination lamps L1 to L5 arranged at the driver's seat are brought into a lit state.

Furthermore, if the respective switches S1 to S5 are switched to the opposite direction from the connection state, the respective fixed contacts are grounded such that the lamps at the respective seats are freely operated for lightening.

The light emitting diodes 22d to be soldered to the printed circuit board 22 are inserted into a holder 25 secured to the printed circuit board 22 before the soldering is done. Thereafter, the lead wire 22d1 of the light emitting diode 22d is inserted into a through hole in the printed circuit board 22 for soldering.

The holder 25 is formed of a resin in the shape of a rectangular sleeve having legs 25a diagonally designed to fit into holes formed in the printed circuit board 22. The inside of the holder 25 is provided with a platform 25b to support the underside of the light emitting diode 22d, the platform 25b having a hole to allow the insertion of the lead wires 22d1. Further, the holder 25 has a wall above the platform 25b, the wall having protruding members 25c to restrain the play of the light emitting diode 22d. The upper portions of the protruding members 25c are formed with slants 25c1 to allow smoother insertion of the light emitting diodes 22d into the holder 25.

The holder 25 is an open top type having an upper portion which flanks the light shielding wall 21f formed in the inner wall surface of the front face plate 21. Therefore, when the light emitting diode 22d is energized to be lit, the light ray radiating from the light emitting diode 22d is emanated toward the transparent window 21e formed in the front plate 21 to do the spot illumination for the cup holders or the like installed inside the vehicle by the light ray therefrom.

In general, visible light rays from the light emitting diode tend to be diffused. However, the light emitting diode used in the present invention is accommodated within the holder 25 to prevent light rays from emanating outside the opening in the holder 25. Since the opening in the holder is positioned to extend in the light shielding wall 21f, light rays spreading out from the opening in the holder 25 are shielded by the light shielding wall 21f and are thereby prevented from being emitted from the room lamp per se.

In the preferred embodiment of the present invention, although the explanation has been given only with respect to the automotive room lamp, it is needless to say that the invention can be applied to devices in which the operation of the circuit of the printed circuit board are controlled by electrically connecting the slide switches and the printed circuit board.

What is claimed is:

1. A slide switch assembly comprising:
   a housing;
   a slider having traveling contacts, said traveling contacts defining exposed contact faces;
   a partition wall having openings, the partition wall defining an accommodation section formed in the housing to receive the slider and allow the slider to be moved slideably therein; and
   a printed circuit board having fixed contact plates, the fixed contact plates including fixation bases attached to the printed circuit board and bent contact portions which are bent so as to extend from the fixation bases, the bent contact portions having an upper end which includes bent engagement portions; wherein
   the printed circuit board is assembled with the housing such that the fixed contact plates are in opposition to the traveling contacts and adapted to make electrical contact with said traveling contacts in response to sliding movement of the slider, and wherein
   the contact portions of the fixed contact plates are positioned so as to be exposed through the openings such that the bent engagement portions at the upper end thereof are engaged with the openings in the partition wall.

2. A slide switch assembly as in claim 1, wherein the printed circuit board includes a printed conduction pattern, and wherein the fixed contact plates include fixation bases soldered to the conduction pattern.

3. A slide switch assembly as in claim 1, wherein the engagement portions include cutouts, and wherein the partition wall includes upright portions defining the openings, and wherein the upright portions are engaged with the cutouts in the fixed contact plates.

4. A slide switch assembly as in claim 1, wherein the printed circuit board has bus bars arranged on one side thereof, the bus bars adapted to being connected electrically to lamps positioned on the printed circuit board.

5. A slide switch assembly as in claim 4, wherein the printed circuit board includes a microphone, a connector terminal box and a light emitting diode.

6. A slide switch assembly as in claim 1, wherein the partition wall defining the accommodation section has an inner wall, wherein the fixed contact plates are positioned substantially flush with the inner wall of the partition wall so as to assure smooth sliding movement of the traveling contacts when the slider is in moved.

* * * * *